(12) United States Patent
Jensen

(10) Patent No.: US 7,395,769 B2
(45) Date of Patent: Jul. 8, 2008

(54) INDIVIDUAL ROW RATE CONTROL OF FARM IMPLEMENTS TO ADJUST THE VOLUME OF CROP INPUTS ACROSS WIDE IMPLEMENTS IN IRREGULARLY SHAPED OR CONTOUR AREAS OF CHEMICAL APPLICATION, PLANTING OR SEEDING

(76) Inventor: Layton W. Jensen, Rural Route 1, Thurston, NE (US) 68062

( * ) Notice: Subject to any disclaimer, the term of this patent is extended or adjusted under 35 U.S.C. 154(b) by 364 days.

(21) Appl. No.: 11/145,689

(22) Filed: Jun. 6, 2005

(65) Prior Publication Data
US 2006/0086295 A1   Apr. 27, 2006

Related U.S. Application Data

(63) Continuation-in-part of application No. 10/970,053, filed on Oct. 21, 2004, now abandoned.

(51) Int. Cl.
| | |
|---|---|
| *A01C 7/00* | (2006.01) |
| *A01C 9/00* | (2006.01) |
| *A01C 23/00* | (2006.01) |
| *G06F 7/70* | (2006.01) |
| *G06F 17/00* | (2006.01) |

(52) U.S. Cl. .................. 111/121; 111/127; 111/174; 111/903; 111/921; 701/50

(58) Field of Classification Search ......... 111/118–120, 111/127, 200, 903, 921, 174, 177, 121; 701/50; 239/10, 161
See application file for complete search history.

(56) References Cited

U.S. PATENT DOCUMENTS

| | | | | |
|---|---|---|---|---|
| 5,678,771 | A | 10/1997 | Chapman | 239/727 |
| 5,971,294 | A | 10/1999 | Thompson et al. | 239/76 |
| 6,206,306 | B1 * | 3/2001 | McFarlane | 239/684 |
| 6,285,938 | B1 * | 9/2001 | Lang et al. | 701/50 |
| 6,539,303 | B2 | 3/2003 | McClure et al. | 701/213 |
| 6,711,501 | B2 | 3/2004 | McClure et al. | 701/213 |

FOREIGN PATENT DOCUMENTS

WO   WO 95/15499 A1 *   6/1995

* cited by examiner

*Primary Examiner*—Christopher J. Novosad
(74) *Attorney, Agent, or Firm*—Thomte Patent Law Office; Dennis L. Thomte

(57) ABSTRACT

A farm implement for applying a product to a row crop or a row seeded field wherein the implement has a plurality of spaced-apart product dispensers mounted thereon, each of which is individually automatically controlled. The rate of product being dispensing from each of the product dispensers is automatically operated dependent upon the ground speed of the individual product dispensers or dependent on other criteria.

17 Claims, 7 Drawing Sheets

INDIVIDUAL ROW RATE CONTROL OF FARM IMPLEMENTS TO ADJUST THE VOLUME OF CROP INPUTS ACROSS WIDE IMPLEMENTS IN IRREGULARLY SHAPED OR CONTOUR AREAS OF CHEMICAL APPLICATION, PLANTING OR SEEDING

CROSS-REFERENCE TO RELATED APPLICATION

This is a continuation-in-part application of Petitioner's earlier application Ser. No. 10/970,053 filed Oct. 21, 2004, now abandoned entitled "INDIVIDUAL ROW SHUT-DOWN CONTROL OF FARM IMPLEMENTS TO ELIMINATE OVERLAP IN IRREGULARLY SHAPED AREAS OF APPLICATION".

BACKGROUND OF THE INVENTION

1. Field of the Invention

The invention of the co-pending application relates to an individual row shut-down control of farm implements or machinery to eliminate overlap in irregularly spaced fields or areas of application. More particularly, the invention of the co-pending application relates to any multiple row seeding, planting, spraying, fertilizing, or the delivery of an agricultural product to the soil on a per row basis whereby any row may be shut down mechanically, electrically, electronically, hydraulically, or by any means, for the purpose of conserving product when a row passes over the top of another row from a previous pass or the projected pass at the end of a field, waterway, or any other ordinary reason for encountering double application (overlap) of product or application into areas of the field such as grass waterways, creeks or terraces where application is not desired.

The instant invention relates to individual row rate control of farm implements to electronically maintain, adjust or compensate, via an electronic control apparatus, the volume or rate of crop inputs such as the dispensing of fertilizers, chemicals or seeds across implements in irregularly shaped or contour areas. More particularly, the instant invention relates to any multiple row seeding, planting, spraying, fertilizing, or the delivery of agricultural product to the soil on a per row basis whereby any row may be controlled mechanically, electrically, electronically, hydraulically, or by any means, for the purpose of optimizing product volume inputs when the ground speed of a row unit is faster or slower than other row units due to its relative position on a wide multiple row implement when the implement is engaged in a contour or turning movement or when said types change and the need for controlling crop input rate is desirable on a per row basis for optimum yield or weed control potential.

2. Description of the Related Art

Agricultural fields are generally irregular in shape and may include obstacles such as creeks, waterways, tree lines, terraces or hillsides that pose specific challenges to machines or implements used to deliver a variety of crop input products such as seed, fertilizer, chemical or the like. As farm operations become larger, the actual field sizes remain constant. However, the need for efficient acreage coverage by fewer farmers drives the need for wider implements. Wider implements pose a problem, particularly when placed in a field requiring a contour or arced (curved) pass across the field since it is commonly known that seed spacing and supporting input volume accuracies are critical in sustaining healthy plants and maximizing yield potential.

As a wide multiple row implement traverses an arced, turning or curved path, the ground speed of the outside rows on the implement is greater than the ground speed of the inside rows. If each row unit such as a planter, seeder, fertilizer applicator, chemical application, etc., on that implement operates at the same rate, the outside rows would be applying inputs at a lesser rate per acre and the inside rows would be applying inputs at a greater rate per acre with only one row near the center of the implement that would actually be performing at the correct rate. Thus, the seed population and fertilizer or chemical application would not be uniform across the arced field pass for maximum yield potential. While it is believed that some implements are possibly capable of controlling sections or multiple rows of the implement, it is not believed that heretofore there is an implement which is capable of individual row input rate control.

SUMMARY OF THE INVENTION

An individual row rate control farm implement or machine is described for applying or dispensing an input product or combination of input products such as fertilizer, seed, chemicals, etc., to a row crop or row seeded crop which, during an arced or curved field pass. The implement and the control mechanism therefore automatically independently adjusts the dispensing of the input product for each row to adjust the application or seeding rate given its relative position on the implement and the corresponding row unit ground speed generated in an arced or curved field pass. The implement includes an elongated, transversely extending frame or tool bar adapted to be moved through the field by a tractor or the like. A plurality of spaced-apart product dispensing devices are mounted on the frame or tool bar to permit the flow of product or a combination of products therethrough for application to the field. A pre-programmed or computerized GPS controlled rate adjustment mechanism is connected to each of the product dispensing devices to control the rate of product flow through the associated product dispensing device in an automatic fashion. In one embodiment, the product dispensing devices are spraying units. In another embodiment, the product dispensing devices are fertilizing units. In yet another embodiment, the product dispensing devices are planter or seeding units. In yet another embodiment, the product dispensing devices are chemical applicators. Further, any or all of the embodiments may be incorporated into the same implement in a multiple combination fashion.

It is therefore a principal object of the invention to provide a farm implement or machine for applying an input product or multiple products simultaneously to a row crop or row seeded field.

Still another object of the invention is to provide a row crop or row seeded crop implement or machine including pre-programmed or computerized GPS controlled product dispensing units thereon which are automatically controlled for rate compensation during an arced field pass to optimize input application rate per acre and maximize yield potential.

Still another object of the invention is to provide a row crop or row seeding crop implement or machine including spaced-apart product dispensing devices which are individually and automatically controlled for rate compensation during an arced field pass to optimize input application rate per acre and maximize yield potential.

These and other objects will be apparent to those skilled in the art.

DETAILED DESCRIPTION OF THE INVENTION

Figure 1:
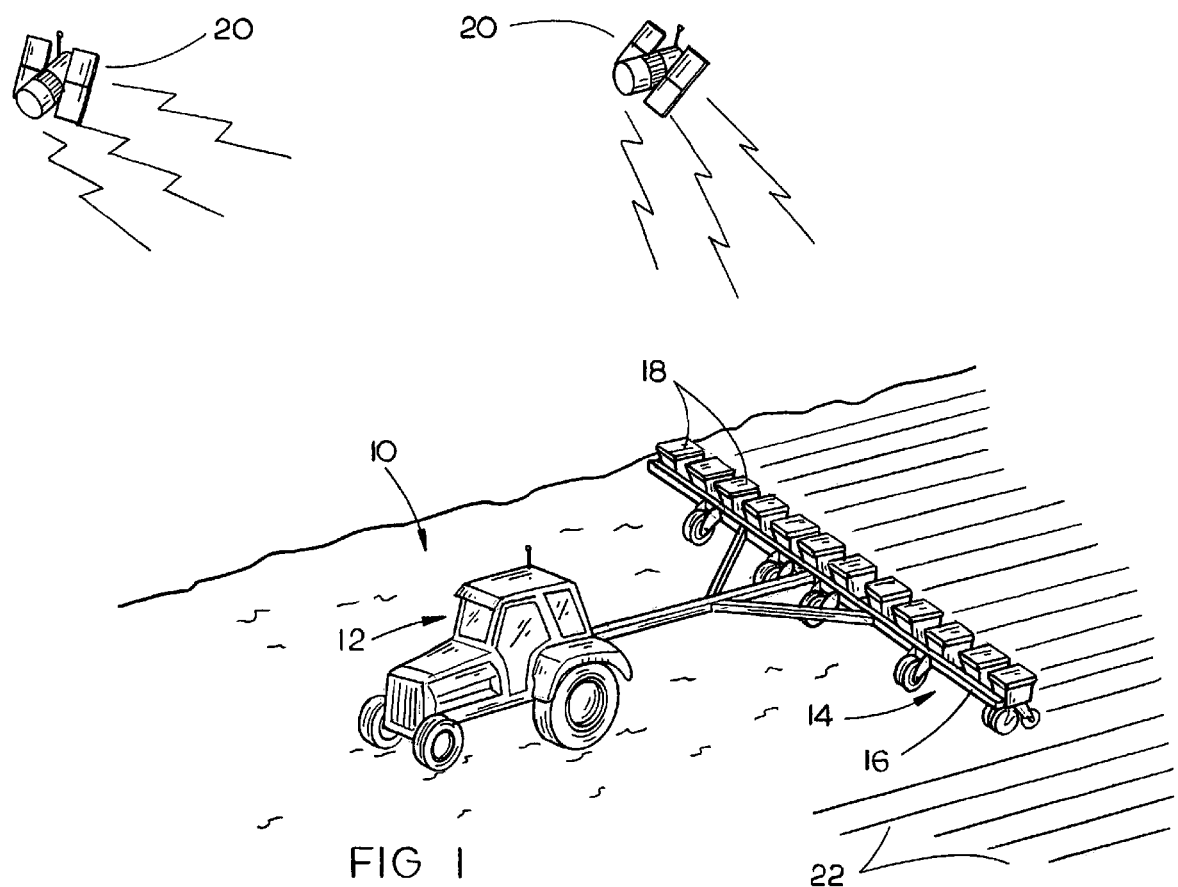
FIG. 1 is a perspective view illustrating a farm implement including product dispensing devices which are each individually controlled by a pre-programmed or computerized GPS system.

In FIG. 1, the numeral 10 refers to a field which has been GPS mapped with that map information being incorporated into a conventional pre-programmed or computerized GPS control system located on the tractor 12. Information is also stored within the GPS control system with respect to the implement or machine 14 being pulled by the tractor 10 relating to the width of the frame or tool bar 16, the number of product dispensing devices 18 on the frame 16, the spacing thereof, the paths, whether curved or straight, that the implement will traverse, etc. The pre-programmed or computerized GPS control system on the tractor receives GPS location information from as many as twenty-four or more satellites 20 so that the GPS control system is able to determine the location of the tractor 12 and implement 14 with respect to the field 10 and with respect to previously planted or sprayed rows 22 to deactivate or shut off individual product dispensing devices 18 to prevent overlap and to adjust the rate of flow from the product dispensing device dependent on the path of the implement whether it is curved or straight. The location information may also be supplied to the control system by ground based stations, pre-programmed location information, or a combination of satellite, ground based stations or pre-programmed location information. The product dispensing devices 18 may be seeding or planting units, sprayers for applying chemicals, fertilizer units, etc.

The GPS controlled product dispensing devices 18 may be activated and deactivated mechanically, electrically, electronically, hydraulically, or by any means, for the purpose of conserving product when a row passes over the top of another row from a previous pass or the projected pass at the end of a field, waterway, or any other ordinary reason for encountering double application or overlap of product. The GPS control system also receives GPS location information as to whether the implement is moving in a particular contour or arced path so that the GPS control system may determine the ground speed of each row unit. The dispensing rate of each of the GPS controlled product dispensing devices is also automatically regulated, varied or controlled from zero percent to three hundred percent or greater dependent on the ground speed of the individual product dispensing device so that the product such as seed, fertilizer or chemical will be evenly and uniformly dispensed according to soil type or optimum yield potential regardless of whether the implement is travelling in a straight line or a curved or arced path. The dispensing rate of each of the product dispensing devices may be individually controlled mechanically, electrically, electronically, hydraulically or by any means.

There may also be situations wherein certain parts of the field may be less fertile than other parts of the field and it is desirable to apply a greater rate of seed or fertilizer to that portion of the field. The pre-programmed or computerized GPS control system will, based on the location of the implement in the field, increase or decrease the rate of product passing from the individual product dispensing devices and will also adjust that amount to compensate for the ground speed of the individual product dispensing devices should the implement be travelling in a curved or arced manner.

Figure 3:
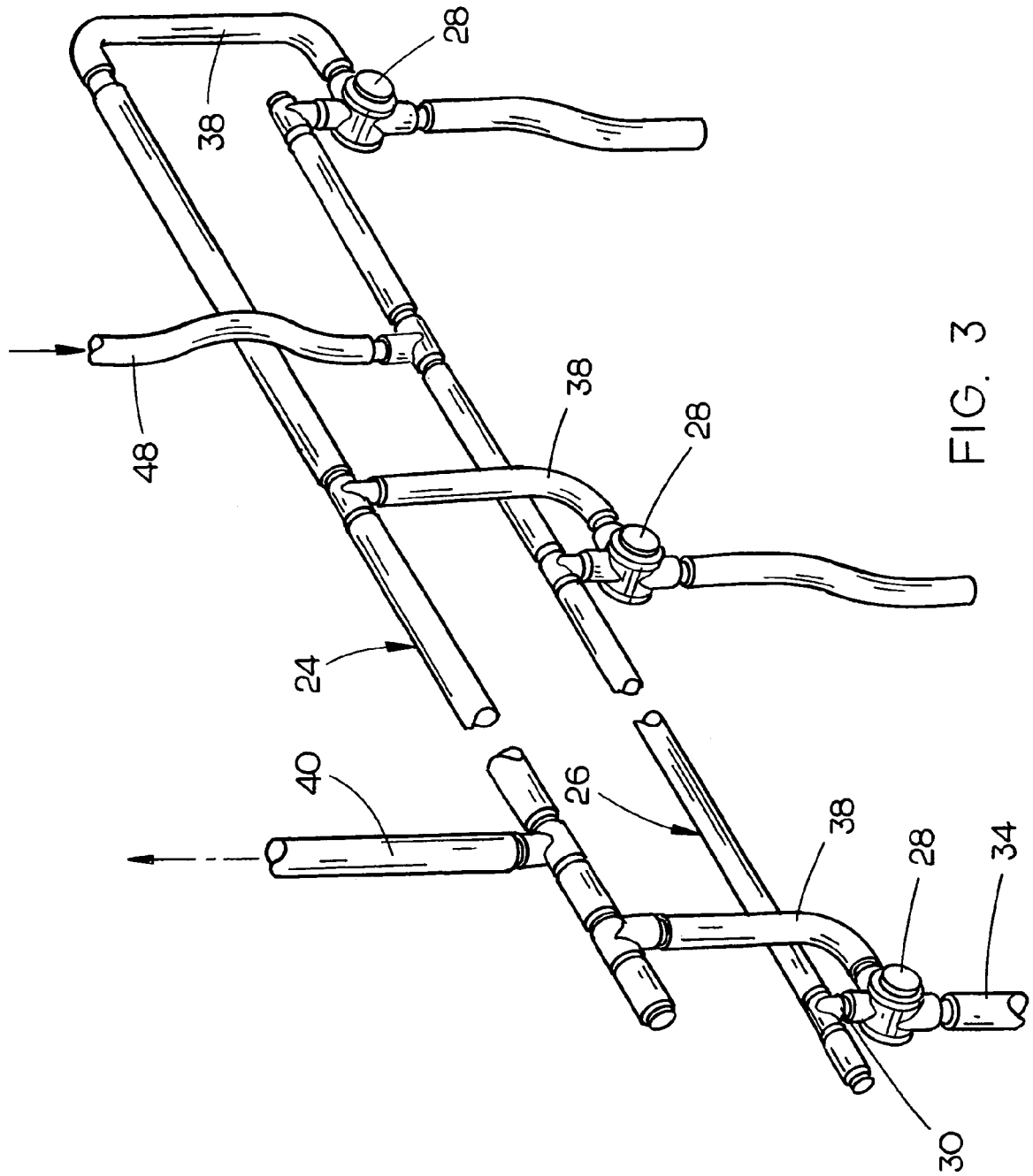
FIG. 3 is a partial perspective view of the manner in which product dispensing devices such as spraying units are individually controlled.
Figure 4:
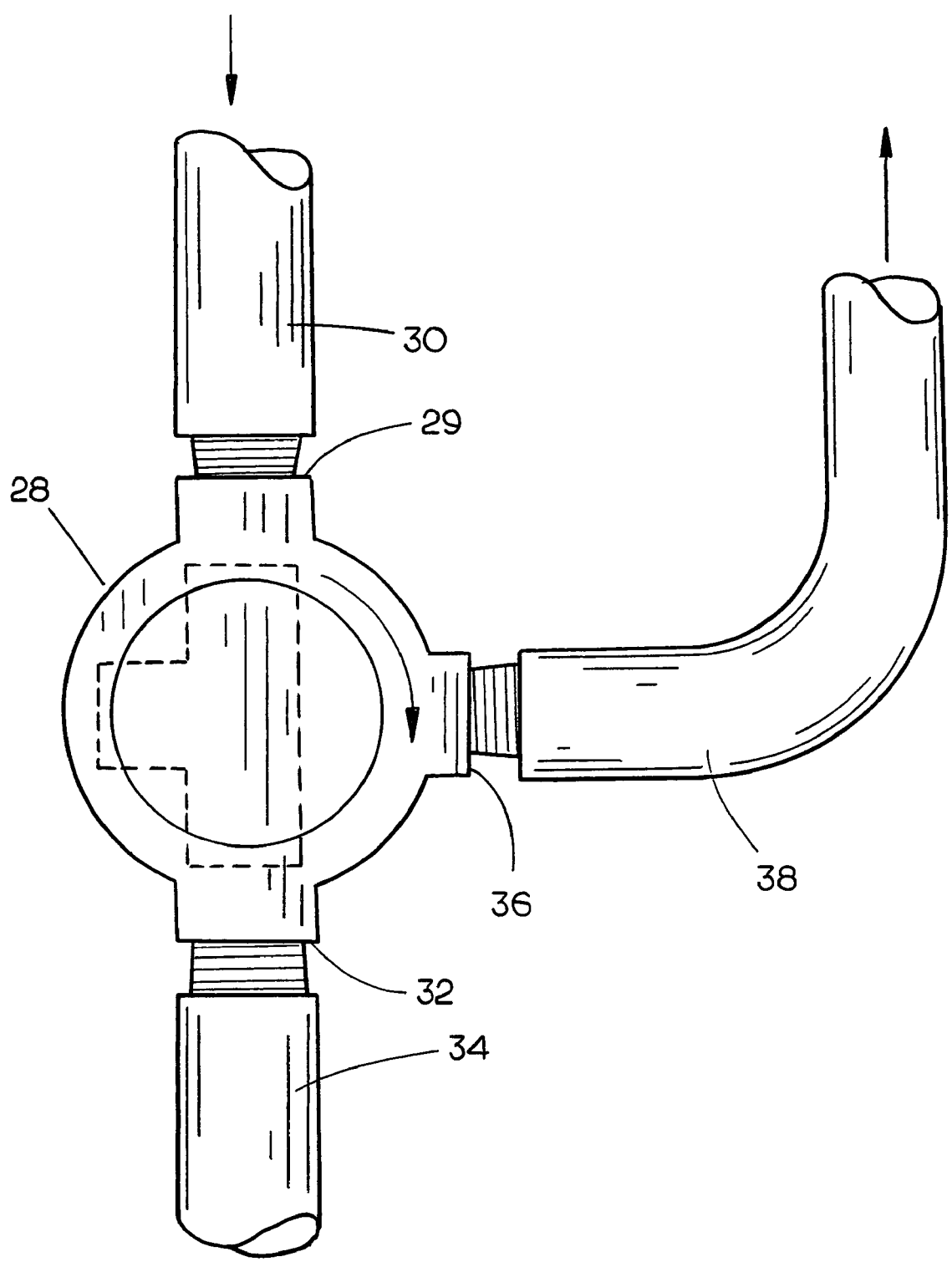
FIG. 4 is an enlarged partial view of a portion of the structure of FIG. 3.
Figure 5:
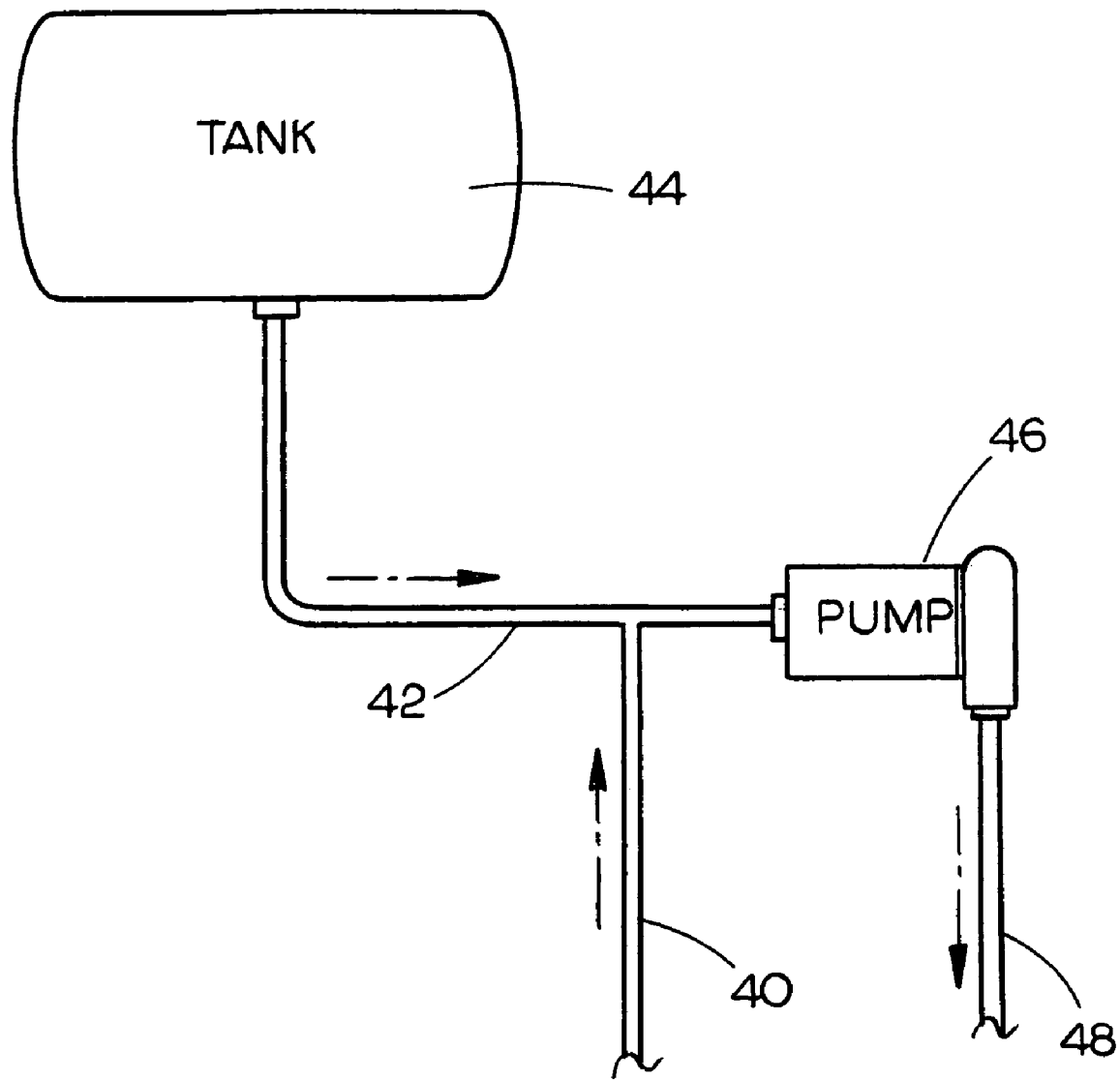
FIG. 5 is a schematic view illustrating the manner in which the product dispensing devices of FIG. 3 may be fluidly connected to a spray tank and pump.

FIGS. 3, 4 and 5 illustrate one method of controlling product dispensing devices such as sprayer units mounted on the implement. A return line manifold 24 is mounted on tool bar 16 so as to extend across substantially the width thereof. The intake sides 29 of mechanically, electrically, electronically or hydraulically controlled bypass valves 28 are fluidly connected to the discharge line 26 by pipes or lines 30. The discharge side 32 of each of the valves 28 has a line 34 extending therefrom to a spray nozzle or other discharge structure. The return side 36 of each of the valves 28 has a line 38 extending therefrom which is connected to the return line 24. Line 40 extends from line 24 to line 42 which extends between tank 44 and the inlet side of pump 46. Line 48 extends from the discharge side of pump 46 to line 26. An adjustable valve 28 and lines 34 and 38 are provided for each of the product dispensing devices so that individual product dispensing devices 18 may be deactivated to prevent overlap as described above and also to vary the rate of flow of the product therefrom. Further, the rate of flow may be controlled for different soil types, etc.

In the normal full width dispensing mode, all of the valves 28 will be open so that liquid from tank 44 passes through line 42, pump 46, line 48, line 26, line 30, valve 28 and line 34. When the GPS control system determines that there will be an overlap as described above, the valves 28 associated with the overlapping product dispensers will be automatically operated to prevent fluid flow therethrough to the line 34 and will direct the fluid flow through line 38, line 24 and line 40 to the inlet side of pump 46. Product dispensing devices other than spraying units may be similarly controlled or controlled by any other means to enable individual product dispensers to be selectively deactivated or shut off to prevent overlap.

Figure 6:
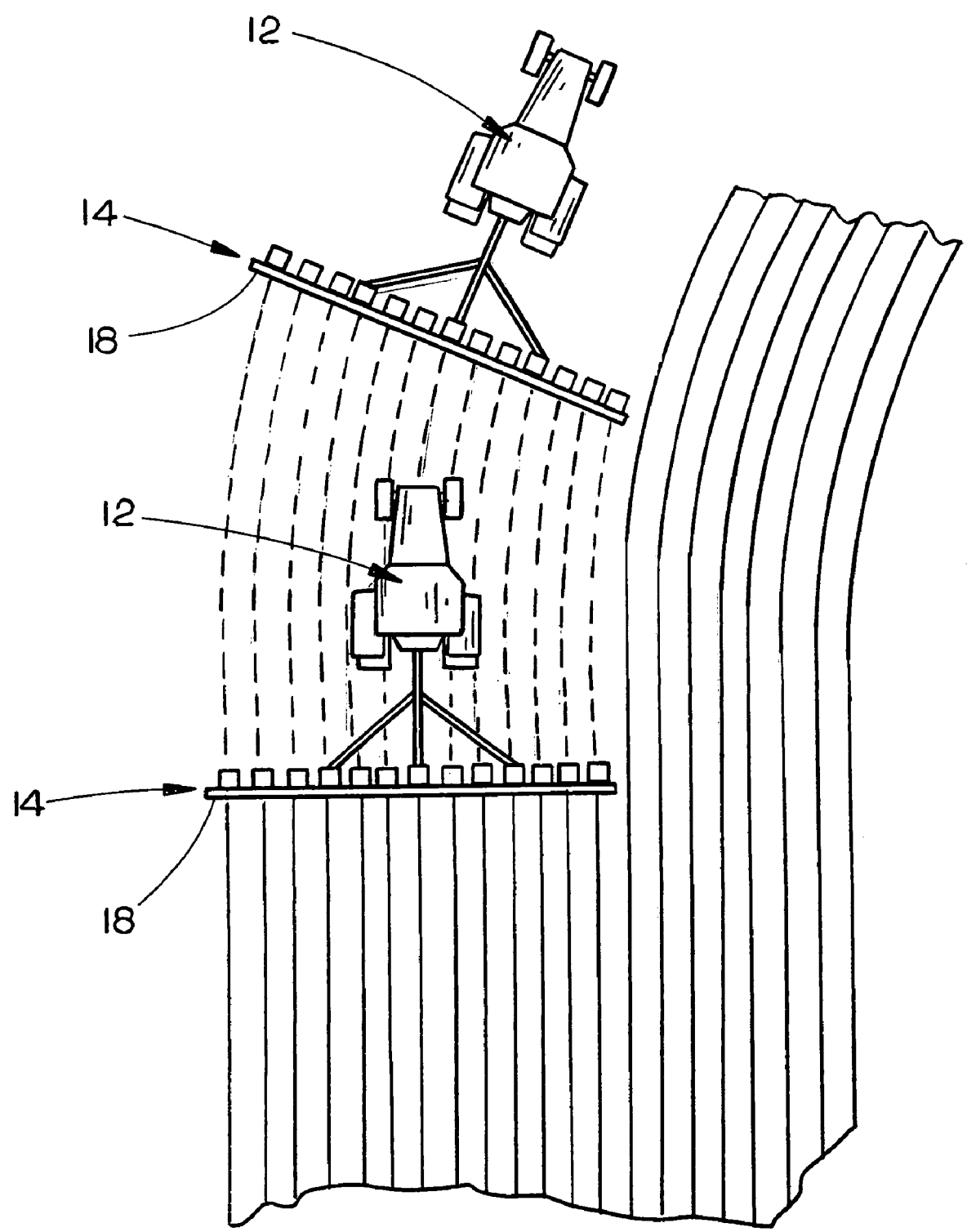
FIG. 6 is a view illustrating individual product dispensing devices being rate controlled during an arced field pass.

When the GPS control system determines that certain of the product dispensing devices 18 have different ground speeds, the dispensing rate of the devices 18 will be automatically adjusted to reduce the rate of dispensing or increase the rate of dispensing dependent upon the ground speed thereof. For example, when the implement 14 is travelling along a curved, contour or arced path, as seen in FIG. 6, the dispensing device 18 on the outer (left) end of the implement 14 will be moving at a greater ground speed than the product dispensing device at the inner (right) end of the implement 14. The input rate of each of the product dispensing devices 18 from the middle of the implement 14 to the left end thereof will be increased while the input rate of each of the product dispensing devices to the right end thereof will be decreased. The outermost device 18 will have a greater rate of input than the device 18 adjacent thereto with that relationship continuing on to the center of the implement. The innermost device 18 will have a lesser rate of input than the device 18 adjacent thereto with that relationship continuing on to the center of the implement.

Figure 2:
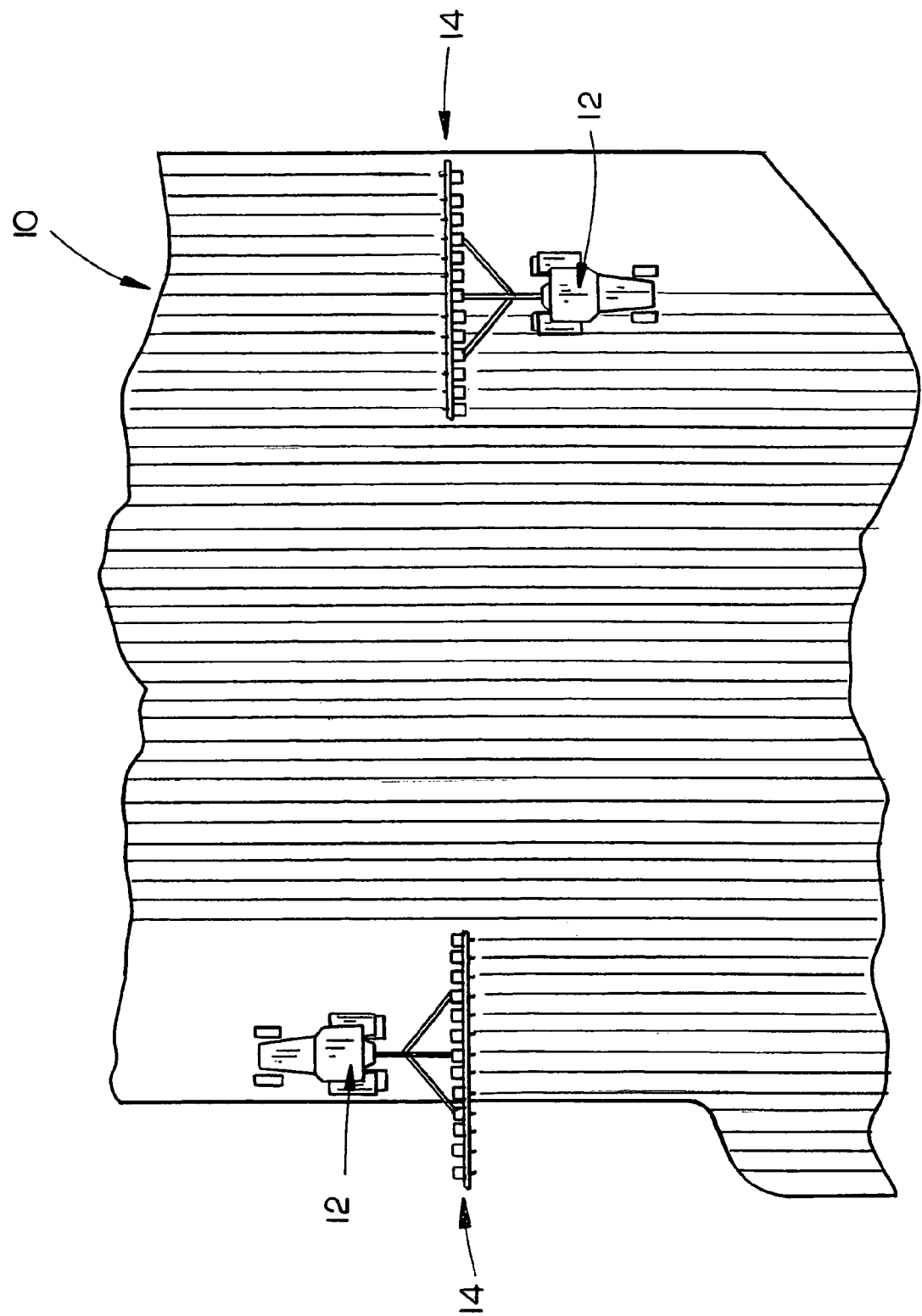
FIG. 2 is a view schematically illustrating individual product dispensing devices being deactivated to prevent overlap.

FIG. 1 illustrates the implement dispensing product for the full width of the implement. The left side of FIG. 2 illustrates product dispensers on the left side of the implement being deactivated to prevent the application of product onto an area outside of the field. The right side of FIG. 2 illustrates product dispensers on the right side of the implement being deactivated to prevent overlap onto a previous pass.

Although valves have been described above, the valves could be clutches or individual motors or flow control valves or some other mechanical device for controlling the flow of product therethrough.

Thus it can be seen that a unique method has been provided wherein individual product dispensing devices on an implement or machine may be automatically shut off by the GPS control system to prevent overlap so as to conserve product and protect the environment as well as regulating the product flow therefrom dependent on the ground speed of the individual row unit.

Figure 7:
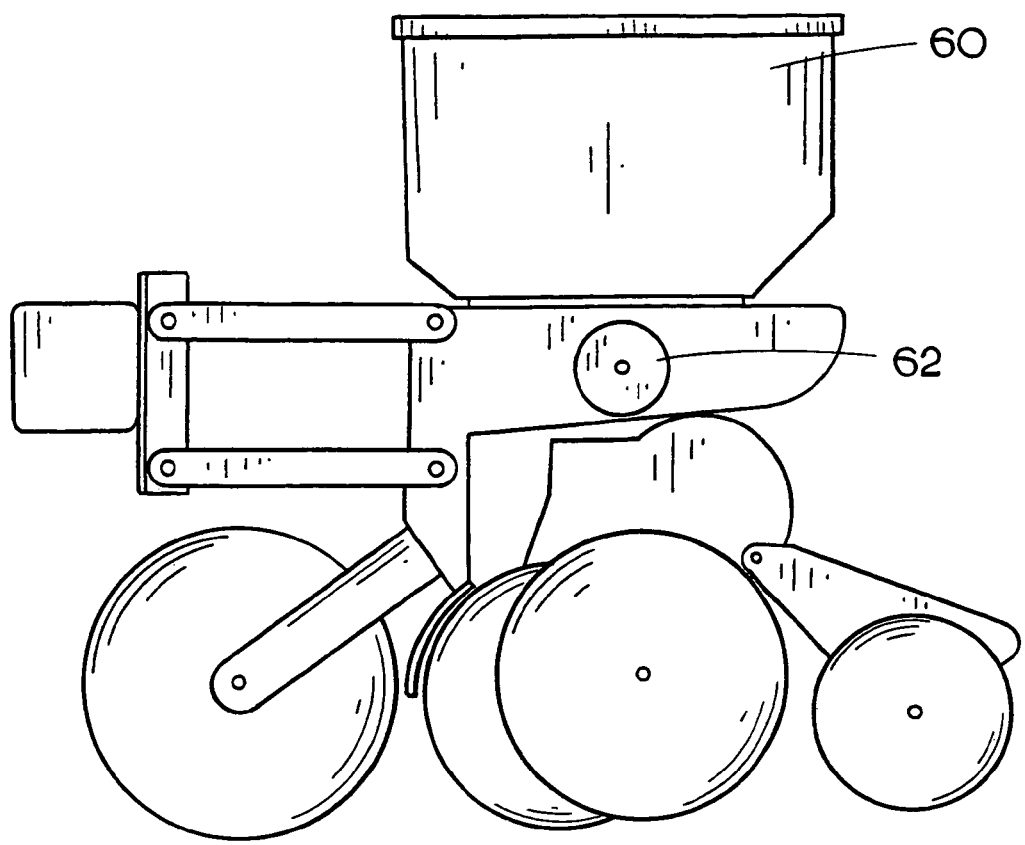
FIG. 7 is a side view of a planter having a planter row unit drive device mounted thereon.
Figure 8:
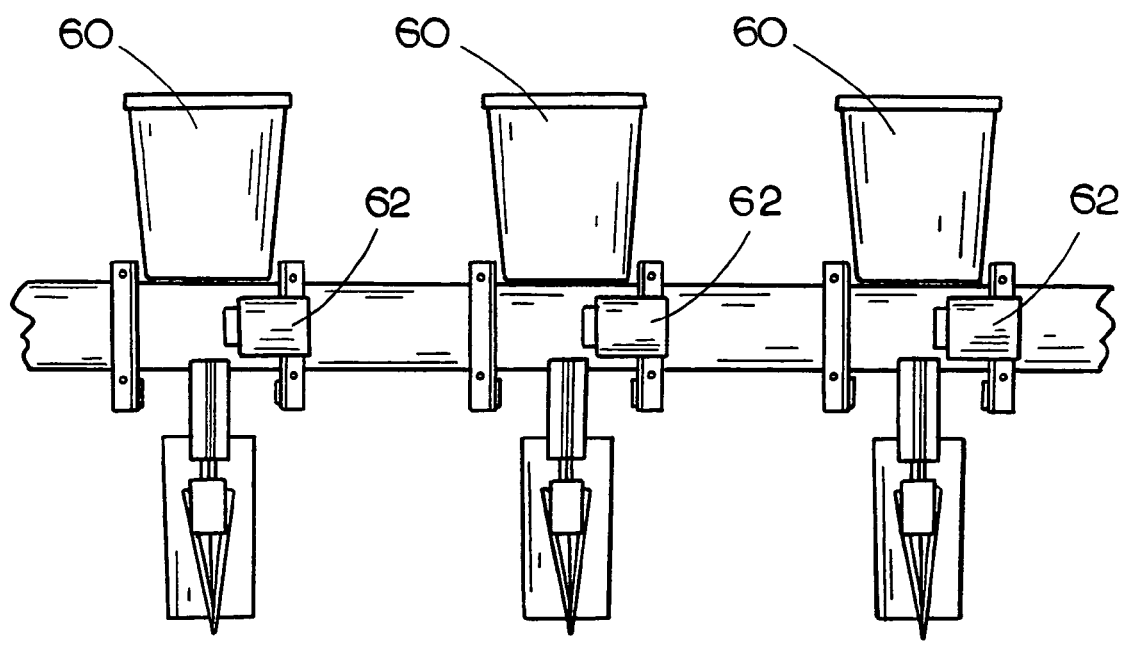
FIG. 8 is a partial rear view of planter devices each having a planter row unit drive device mounted thereon.

FIG. 7 is a side view of a product dispensing device such as a row planter 60 having a planter row unit drive device 62 associated therewith. FIG. 8 is a partial rear view of a plurality of row planters 60 each having a planter row unit drive device 62 mounted thereon.

Thus it can be seen that the invention accomplishes at least all of its stated objectives.

I claim:

1. A farm implement for applying a product to a row crop or row seeded field, comprising:
    an elongated transversely extending frame means adapted to be moved through the row crop or row seeded field;
    a plurality of spaced-apart product dispensing devices mounted on said frame means;
    and a rate control mechanism connected to each of said product dispensing devices;
    each of said rate control mechanisms adapted to permit the variable flow of product through the associated product dispensing device dependent upon the ground speed of the product dispensing device.

2. The farm implement of claim 1 wherein the rate control mechanisms are GPS controlled.

3. The farm implement of claim 2 wherein said GPS controlled rate control mechanisms are individually controlled by pre-programmed or computerized control means.

4. The farm implement of claim 1 wherein said product dispensing devices are spraying units.

5. The farm implement of claim 1 wherein said product dispensing devices are fertilizing units.

6. The farm implement of claim 1 wherein said product dispensing devices are planting units.

7. The farm implement of claim 1 wherein said product dispensing devices are seeding units.

8. The farm implement of claim 1 wherein said product dispensing devices are chemical applicators.

9. The farm implement of claim 1 wherein a mechanically operated control mechanism is associated with the farm implement; said control mechanism individually operating each of said product dispensing devices.

10. The farm implement of claim 9 wherein said mechanically operated control mechanisms operate individually in response to pre-programmed or computerized GPS control means.

11. The farm implement of claim 1 wherein an electrically operated control mechanism is associated with the farm implement; said control mechanism individually controlling each of said product dispensing devices.

12. The farm implement of claim 11 wherein said electrically operated control mechanisms operate in response to a pre-programmed or computerized GPS control means.

13. The farm implement of claim 1 wherein an electronically operated control mechanism is associated with the farm implement; said control mechanism individually controlling each of said product dispensing devices.

14. The farm implement of claim 13 wherein said electronically operated control mechanisms operate in response to a pre-programmed or computerized GPS control means.

15. The farm implement of claim 1 wherein a hydraulically operated control mechanism is associated with the farm implement; said control mechanism individually controlling each of said product dispensing devices.

16. The farm implement of claim 15 wherein said hydraulically operated control mechanisms operate in response to a pre-programmed and computerized GPS control means.

17. The farm implement of claim 1 wherein each of said rate control mechanisms is individually and variably adjustable.

* * * * *